United States Patent
Deng et al.

(10) Patent No.: US 7,269,036 B2
(45) Date of Patent: Sep. 11, 2007

(54) METHOD AND APPARATUS FOR ADJUSTING WAKEUP TIME IN ELECTRICAL POWER CONVERTER SYSTEMS AND TRANSFORMER ISOLATION

(75) Inventors: Duo Deng, Canton, MI (US); Anil Tuladhar, Dearborn Heights, MI (US); Kent M. Harmon, Troy, MI (US)

(73) Assignee: Siemens VDO Automotive Corporation, Auburn Hills ( * ) Notice: Subject to any disclaimer, the term of this patent is extended or adjusted under 35 U.S.C. 154(b) by 273 days.

(21) Appl. No.: 10/844,060

(22) Filed: May 12, 2004

(65) Prior Publication Data

US 2005/0018454 A1    Jan. 27, 2005

Related U.S. Application Data

(60) Provisional application No. 60/470,323, filed on May 12, 2003.

(51) Int. Cl.
*H02M 1/00* (2006.01)
*G06F 1/00* (2006.01)

(52) U.S. Cl. .................. 363/49; 323/901; 323/906; 713/340

(58) Field of Classification Search ................ 323/906, 323/901; 363/49; 713/340
See application file for complete search history.

(56) References Cited

U.S. PATENT DOCUMENTS

| | | | |
|---|---|---|---|
| 4,333,136 A * | 6/1982 | Baker | 363/43 |
| 4,636,931 A * | 1/1987 | Takahashi et al. | 363/71 |
| 4,649,334 A * | 3/1987 | Nakajima | 323/299 |
| 4,661,897 A | 4/1987 | Pitel | 363/17 |
| 4,674,024 A | 6/1987 | Paice et al. | 363/71 |
| 4,922,124 A * | 5/1990 | Seki et al. | 307/87 |
| 5,184,291 A | 2/1993 | Crowe et al. | 363/37 |
| 5,268,832 A * | 12/1993 | Kandatsu | 363/95 |
| 5,422,440 A | 6/1995 | Palma | 174/133 B |
| 5,459,356 A | 10/1995 | Schulze et al. | 257/773 |
| 5,508,560 A | 4/1996 | Koehler et al. | 257/730 |
| 5,831,479 A * | 11/1998 | Leffel et al. | 330/124 D |
| 5,838,148 A * | 11/1998 | Kurokami et al. | 323/299 |
| 5,867,060 A * | 2/1999 | Burkett et al. | 330/2 |
| 5,923,100 A * | 7/1999 | Lukens et al. | 307/66 |

(Continued)

FOREIGN PATENT DOCUMENTS

CA    2120637 A  *  10/1995

(Continued)

OTHER PUBLICATIONS

Applebaum, J., "The Quality of Load Matching in a Direct-Coupling Photovoltaic System," *IEEE Transactions on Energy Conversion* EC-2(4):534-541, Dec. 1987.

Braunstein, A., et al., "On the Dynamic Optimal Coupling of a Solar Cell Array to a Load and Storage Batteries," *IEEE Transactions on Power Apparatus and Systems* PAS-100(3):1183-1187, Mar. 1981.

(Continued)

*Primary Examiner*—Karl Easthom
*Assistant Examiner*—Harry Behm

(57) ABSTRACT

An electrical power converter system adjusts a wakeup voltage periodically, to permit earlier connection and/or operation, to increase performance. The electrical power converter system selects between a mathematically adjusted wakeup voltage based on at least one previous period, and a table derived wakeup voltage that takes into account historical information. The electrical power converter system is particularly suited to applications with periodicity such as solar based photovoltaic power generation.

12 Claims, 3 Drawing Sheets

U.S. PATENT DOCUMENTS

| | | | |
|---|---|---|---|
| 6,046,919 A * | 4/2000 | Madenokouji et al. | 363/98 |
| 6,072,707 A | 6/2000 | Hochgraf | 363/71 |
| 6,078,173 A | 6/2000 | Kumar et al. | 324/158.1 |
| 6,212,087 B1 | 4/2001 | Grant et al. | 363/144 |
| 6,222,347 B1 * | 4/2001 | Gong | 320/137 |
| 6,252,785 B1 * | 6/2001 | Hagihara et al. | 363/71 |
| 6,259,017 B1 * | 7/2001 | Takehara et al. | 307/82 |
| 6,291,764 B1 * | 9/2001 | Ishida et al. | 322/2 R |
| 6,534,990 B2 * | 3/2003 | Hocken et al. | 324/416 |
| 6,584,197 B1 * | 6/2003 | Boudreaux et al. | 379/413.02 |
| 6,685,334 B2 * | 2/2004 | Kenny et al. | 362/183 |
| 7,058,484 B1 * | 6/2006 | Potega | 700/297 |
| 2002/0034088 A1 | 3/2002 | Parkhill et al. | 363/144 |
| 2002/0118560 A1 | 8/2002 | Ahmed et al. | 363/144 |
| 2002/0167828 A1 | 11/2002 | Parkhill et al. | 363/144 |

FOREIGN PATENT DOCUMENTS

| | | |
|---|---|---|
| EP | 0 427 143 A2 | 5/1991 |
| EP | 0 578 108 A1 | 1/1994 |

OTHER PUBLICATIONS

Hussein, K., et al., "Maximum Photovoltaic Power Tracking: An Algorithm for Rapidly Changing Atmospheric Conditions," *IEE Proc.-Gener. Transm. Distrib.* 142(1):59-64, Jan. 1995.

U.S. Appl. No. 60/467,332, filed May 2, 2003, Deng et al.

U.S. Appl. No. 60/470,321, filed May 12, 2003, Deng et al.

Mohan et al., *Power Electronics: Converters, Applications and Designs*, John Wiley & Sons Inc., USA, 1989, Chapter 26-8, "Circuit Layout," p. 654.

Nafeh, A., et al., "Microprocessor Control System for Maximum Power Operation of PV Arrays," *Intl. Journal of Num. Model.* 12:187-195, 1999.

Sugimoto, H., et al., "A New Scheme for Maximum Photovoltaic Power Tracking Control," in *Proceedings of the Power Conversion Conference*, Nagaoka, 1997, vol. 2, pp. 691-696.

Tse, K., et al., "A Novel Maximum Power Point Tracker for PV Panels Using Switching Frequency Modulation," *IEEE Transactions on Power Electronics* 17(6):980-989, Nov. 2002.

Wolf, S., et al., "Economical, PV Maximum Power Point Tracking Regulator with Simplistic Controller," in *Proceedings of the IEEE Power Electron. Spec. Conference*, 1993, pp. 581-587.

* cited by examiner

METHOD AND APPARATUS FOR ADJUSTING WAKEUP TIME IN ELECTRICAL POWER CONVERTER SYSTEMS AND TRANSFORMER ISOLATION

BACKGROUND OF THE INVENTION

1. Field of the Invention

The present systems and methods relate to electrical power converter systems, and particularly to electrical power converter systems suitable for photovoltaic and other periodic applications.

2. Description of the Related Art

Electrical power converter systems are used to transform and/or condition electrical power in a variety of applications. For example, electrical power converter systems may transform AC power from a power grid to a form suitable for a standalone application (e.g., powering an electric motor, lights, electric heater, household or commercial equipment, telecommunications equipment, computing equipment, uninterruptible power supply (UPS)). Also for example, electrical power converter systems may transform power from a standalone power source such as an array of photovoltaic cells, fuel cell system, micro-turbine, or flywheel, for use in a standalone application and/or for export to, or by, a power grid.

The electrical power converter system may comprise one or more subsystems such as a DC/AC inverter, DC/DC converter, and/or AC/DC rectifier. Typically, electrical power converter systems will include additional circuitry and/or programs for controlling the various subsystems, and for performing switching, filtering, noise and transient suppression, and device protection.

In many power conversion applications, it is highly desirable to realize the maximum efficiency possible. For example, in photovoltaic applications the cost of photovoltaic arrays is still relatively high, and the physical area occupied by photovoltaic arrays may be undesirably large, particularly where real estate is at a premium. Thus it is desirable to use the least number of photovoltaic cells as possible to achieve the desired power output.

Many power conversion applications are periodic in nature. For example, typical photovoltaic applications are strongly influenced by the relative movement of the sun. The time that the sun rises and/or sets, and the relative position of the sun in the sky throughout the day, determines the amount of power that the photovoltaic cells may generate. Further, the relative position of the sun throughout the year determines the amount of power the photovoltaic cells may generate, and determines the time of sunrise and sunset. Similarly, micro-turbine applications such as hydroelectric power generation may experience a similar periodicity, for example, as water flows increase due to rain or melting snow, on a daily and/or seasonal basis.

It is desirable to have a method and apparatus for converting power that makes the maximum use of the power generated by a power source, such as a photovoltaic array or micro-turbine. However, coupling the electrical power converter system to the power grid before sufficient power is being generated by the power source will result in the electrical power converter system disadvantageously dissipating some power from the power grid, for example, via a transformer in the electrical power converter system. Thus, it is desirable to have a relatively inexpensive, reliable and electrically efficient method and apparatus for electrical power conversion that switches ON or "wakes" the electrical power converter system as early as possible in the power generation cycle, but not before sufficient power is being generated. The present systems and methods are directed at these issues and provide further related advantages.

BRIEF SUMMARY OF THE INVENTION

An electrical power converter system adjusts a wakeup voltage periodically, to permit earlier connection and/or operation, to increase performance. The electrical power converter system selects between a mathematically adjusted wakeup voltage based on at least one previous period, and a table derived wakeup voltage that takes into account historical information. The electrical power converter system is particularly suited to applications with periodicity such as solar based photovoltaic power generation.

In one aspect, a method of operating an electrical power converter system to transform power for a power source comprises determining an amount of power available from a power source at approximately a startup time; and adjusting a value of a wakeup voltage parameter of the electrical power converter system from a value of the wakeup voltage parameter of the electrical power converter system for a previous period based at least in part on the determined amount of power available from the power source at approximately the startup time. Adjusting a value of a wakeup voltage parameter from that of a previous period may comprise increasing the value of the wakeup voltage parameter if the amount of power at approximately the startup time is less than a startup power threshold. Adjusting a value of a wakeup voltage parameter from that of a previous period may comprise decreasing the value of the wakeup voltage parameter if the amount of power at approximately the startup time is greater than a startup power threshold. The method may further comprise selecting between the value of the wakeup voltage parameter calculated in real time and a value of the wakeup voltage parameter stored in a historically based lookup table, where the value of the wakeup voltage parameter from the historically based lookup table is based at least in part on a real time clock.

In another aspect, a method of operating an electrical power converter system to transform power from a power source comprises selecting between a value of a wakeup voltage parameter calculated in real time and a value of the wakeup voltage parameter stored in a historically based lookup table, where the value of the wakeup voltage parameter from the historically based lookup table is based at least in part on a real world time; determining a voltage available from the power source; determining if the determined voltage available from the power source exceeds the selected value of the wakeup voltage parameter; if the determined voltage available from the power source exceeds the selected value of the wakeup voltage parameter, determining a power available from the power source; determining if the power available from the power source is less than a startup power threshold; providing power to a load if the power available from the power source is not less than the startup power threshold; and calculating a value of the wakeup voltage parameter based on whether the power available from the power source is less than or greater than the startup power threshold.

In yet another aspect, an electrical power converter system comprises at least a first switch operable between an ON state and an OFF state; and a controller coupled to control the at least first switch, and configured to determine an amount of power available from a power source at approximately a startup time and to adjust a value of a wakeup voltage parameter of the electrical power converter system from a value of the wakeup voltage parameter of the electrical power converter system for a previous period based at least in part on the determined amount of power available from the power source at approximately the startup time.

In a further aspect, an electrical power converter system comprises an input bus; an output bus; at least a first switch electrically coupled between the input and the output buses; and a controller coupled to control the at least one switch, the controller configured to select between a value of a wakeup voltage parameter calculated in real time and a value of the wakeup voltage parameter stored in a historically based lookup table, where the value of the wakeup voltage parameter from the historically based lookup table is based at least in part on a real world time. The controller may be configured to select the value of the wakeup voltage parameter stored in the historically based lookup table if both an operating state is a sleep state and a real time is at least equal to a wakeup time.

BRIEF DESCRIPTION OF THE DRAWING(S)

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION OF THE INVENTION

In the following description, certain specific details are set forth in order to provide a thorough understanding of the various embodiments of the present systems and methods. However, one skilled in the art will understand that the present systems and methods may be practiced without these details. In other instances, well-known structures associated with photovoltaic cells, power converters such as AC→DC rectifiers, DC→AC inverters, and/or DC/DC converters, have not been shown or described in detail to avoid unnecessarily obscuring descriptions of the embodiments of the present systems and methods.

Unless the context requires otherwise, throughout the specification and claims which follow, the word "comprise" and variations thereof, such as, "comprises" and "comprising" are to be construed in an open, inclusive sense, that is as "including, but not limited to."

The headings provided herein are for convenience only and do not interpret the scope or meaning of the claimed invention.

Figure 1:
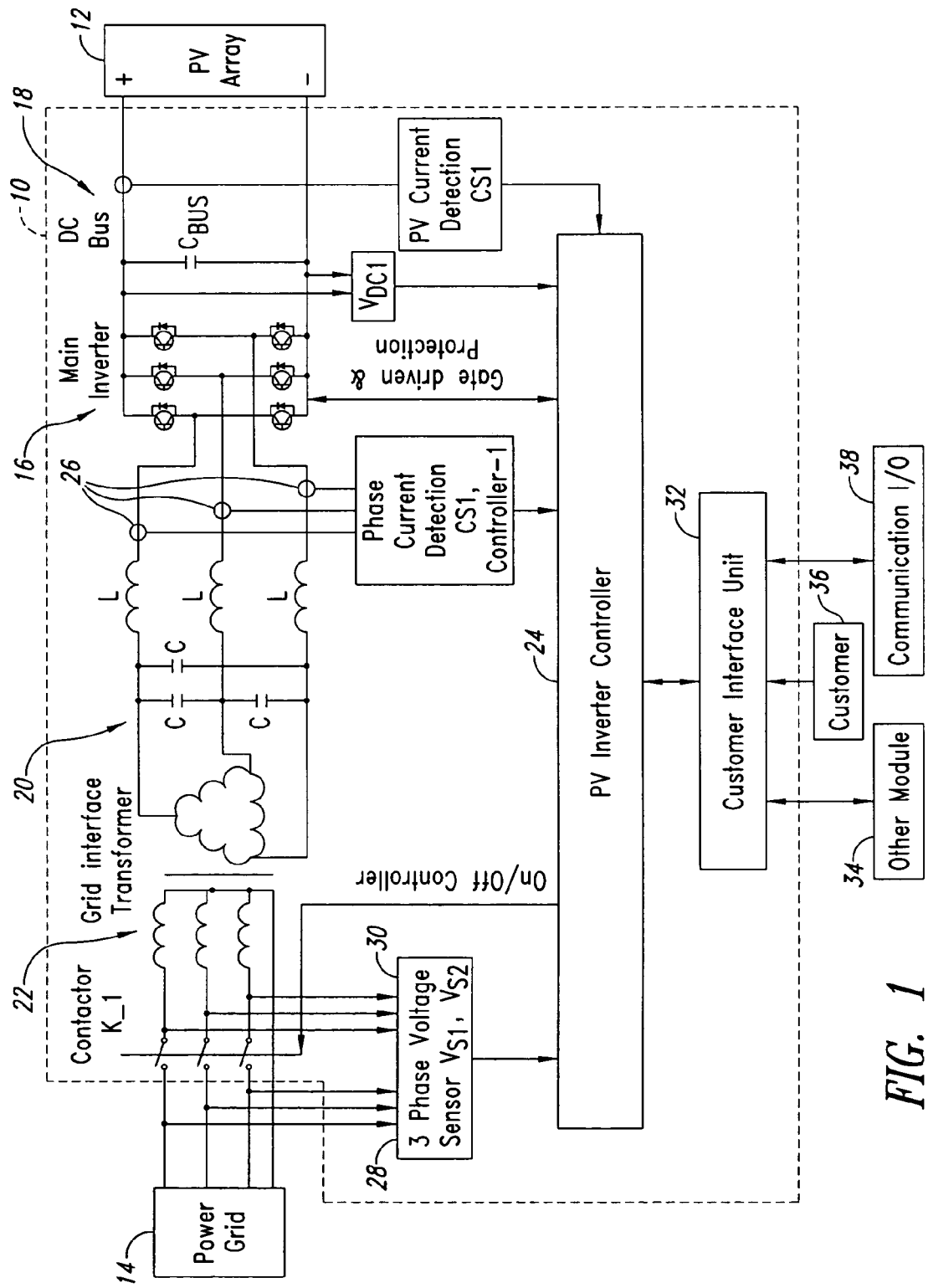
FIG. 1 is a schematic diagram of an environment suitable for practicing the present systems and methods, comprising an electrical power converter system coupling a periodic source such as a PV array to a power grid.

FIG. 1 shows an electrical power converter system 10 coupling a power source, such as a PV array 12, to a load, such as a power grid 14. The PV array 12 typically produces DC power in response to light. The amount of power produced by the PV array 12 is a function of the intensity of light received by the PV array 12. Thus, where the source of light is the sun, the amount of power produced will be periodic, changing throughout the day, and/or throughout the year.

The power grid 14 typically carries 3-phase AC power, and is capable of supplying and receiving power. The electrical power converter system 10 inverts the DC power from the PV array 12 into AC power for supply to the power grid 14.

The electrical power converter system 10 comprises a variety of subsystems and components. For example, a main inverter 16 separates a DC bus 18 from an AC bus 20, and inverts the DC power into AC power. A bus capacitor $C_{BUS}$ is electrically coupled across the DC bus 18 in parallel with the PV array 12. The main inverter 16 may be of a variety of types, for example, one or more bridges configured from a number of transistors such as three half bridges formed from six insulated gate bipolar transistors (IGBT) and associated diodes. As will be apparent to those of skill in the art, the same DC to AC conversion may be accomplished using other numbers of half bridges, which correspond to a phase, and each switching pair may contain any number of switching devices. For simplicity and clarity, the discussion herein assumes a common three phase/three switching pair configuration, although other configurations are of course possible.

A grid interface transformer 22 inductively couples the output of the main inverter 16 to the power grid 14, providing electrical isolation therebetween. Inductors L are electrically coupled on the AC bus 20 between the grid interface transformer 22 and the main inverter 16. Capacitors C are electrically coupled across the phases of the AC bus 20.

A number of contactors K_1 are operable for connecting and disconnecting the electrical power converter system 10 with the power grid 14.

A controller 24 is coupled to receive various signals indicative of system operation and to provide signals to control various elements of the electrical power conversion system 10. The controller 24 may take the form of a microprocessor, micro-controller or application specific integrated circuit (ASIC), and may be implemented in software, hardware and/or firmware.

The controller 24 receives signals indicative of phase currents from a set of phase current sensors 26. The controller 24 also receives signals indicative of phase voltages $V_{S1}$ (e.g., voltages for each of the three phases) from a first set of phase voltage sensors 28 on the power grid 14 side of the contactors K_1, and receives signals indicative of phase voltages $V_{S2}$ (e.g., voltages for each of the three phases) from a second set of phase voltage sensors 30 on the main inverter 16 side of the contactors K_1. The controller 24 also receives signals indicative the current being produced by the photovoltaic array 12.

The controller 24 may further receive signals via a customer interface unit 32, for example from another electrical power conversion system 34, customer 36 and/or communications I/O 38.

The controller 24 provides signals to operate the switches (e.g., IGBTs) of the main inverter 16, for example, via a gate drive controller. The controller 24 also provides signals to operate the contactors K_1 for connecting and disconnecting the electrical power converter system 10 with the power grid 14.

Figure 2:
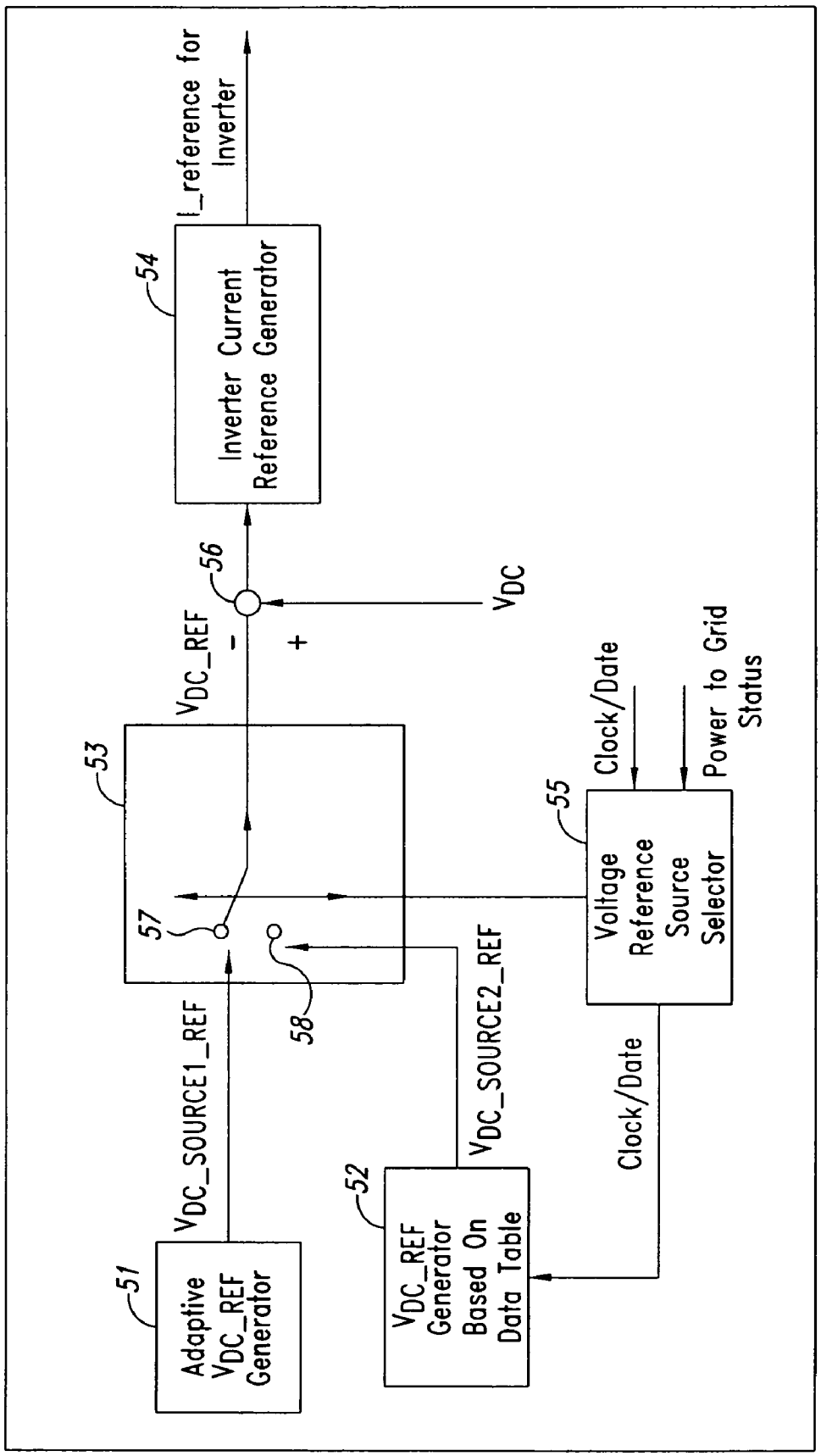
FIG. 2 is a block diagram of a controller suitable for controlling the electrical power converter system of FIG. 1.

FIG. 2 illustrates certain aspects of the controller 24. An adaptive DC voltage reference generator 51 produces a DC voltage source reference $V_{DC\_SOURCE1\_REF}$. The adaptive DC voltage reference generator 51 computationally determines the DC voltage source reference $V_{DC\_SOURCE1\_REF}$, adjusting the wakeup voltage WK_UP_V from the previous period based on the power produced at the startup of the main inverter 16. For example, if the most recent wakeup voltage WK_UP_V results in sufficiently more power at the start up, the adaptive DC voltage reference generator 51 will lower the wake up voltage WK_UP_V for the next cycle. This ensures that the main inverter 16 will connect to the power grid 14 earlier in the next period (e.g., the next day) to export more power to the power grid 14. If, however, the most recent wake up voltage WK_UP_V does not provide sufficient power (e.g., sufficient to maintain the power delivery state or some other threshold), the adaptive DC voltage reference generator 51 increases the wake up voltage WK_UP_V for the next cycle. This approach prevents the main inverter 16 from repeatedly attempting to connect to the power grid 14 when the PV array 12 is not producing sufficient power. This approach also adjusts the wake up voltage WK_UP_V to extend the time of power delivery so that maximum energy is extracted from the PV array 12 and delivered to the power grid 14.

A voltage reference source selector 55 receives clock and/or date information and power to grid status information, and in response produces a clock and/or date signal.

A DC voltage reference generator 52 receives clock and/or date information from the voltage reference source selector 55, and produces a DC voltage source reference $V_{DC\_SOURCE2\_REF}$. The DC voltage reference generator 52 employs a lookup table based on history data, for example, daily times of sun-rise at the particular location of installation of the electrical power converter system 10. While the DC voltage reference generator 52 may rely on the data from the lookup table for performing one or more calculations, in many cases it will be more efficient to store the end result in the lookup table, for example, the table based wake up voltage values. The lookup table may be based on additional or different historical information. This approach ensures that electrical power converter system 10 will not be unduly hindered by aberrations, such as where the previous day was cloudy, and also avoids unnecessary oscillation in the starting point of the electrical power converter system 10.

In addition to producing the clock/date signal, the voltage reference source selector 55 also operates a switch or switching logic 53 for selectively switching between the DC voltage source references $V_{DC\_SOURCE1\_REF}$, $V_{DC\_SOURCE2\_REF}$ produced by the adaptive DC voltage reference generator 51 and the DC voltage reference generator 52, respectively, and placed on nodes 57, 58, respectively. The output $V_{DC\_REF}$ of the switch or switching logic 53 is summed with $V_{DC}$ by an adder or summer 56. The sum is provided to an inverter current reference generator 54, which produces a current reference $I_{REFERENCE\_FOR\_INVERTER}$ for operating the inverter.

Figure 3:
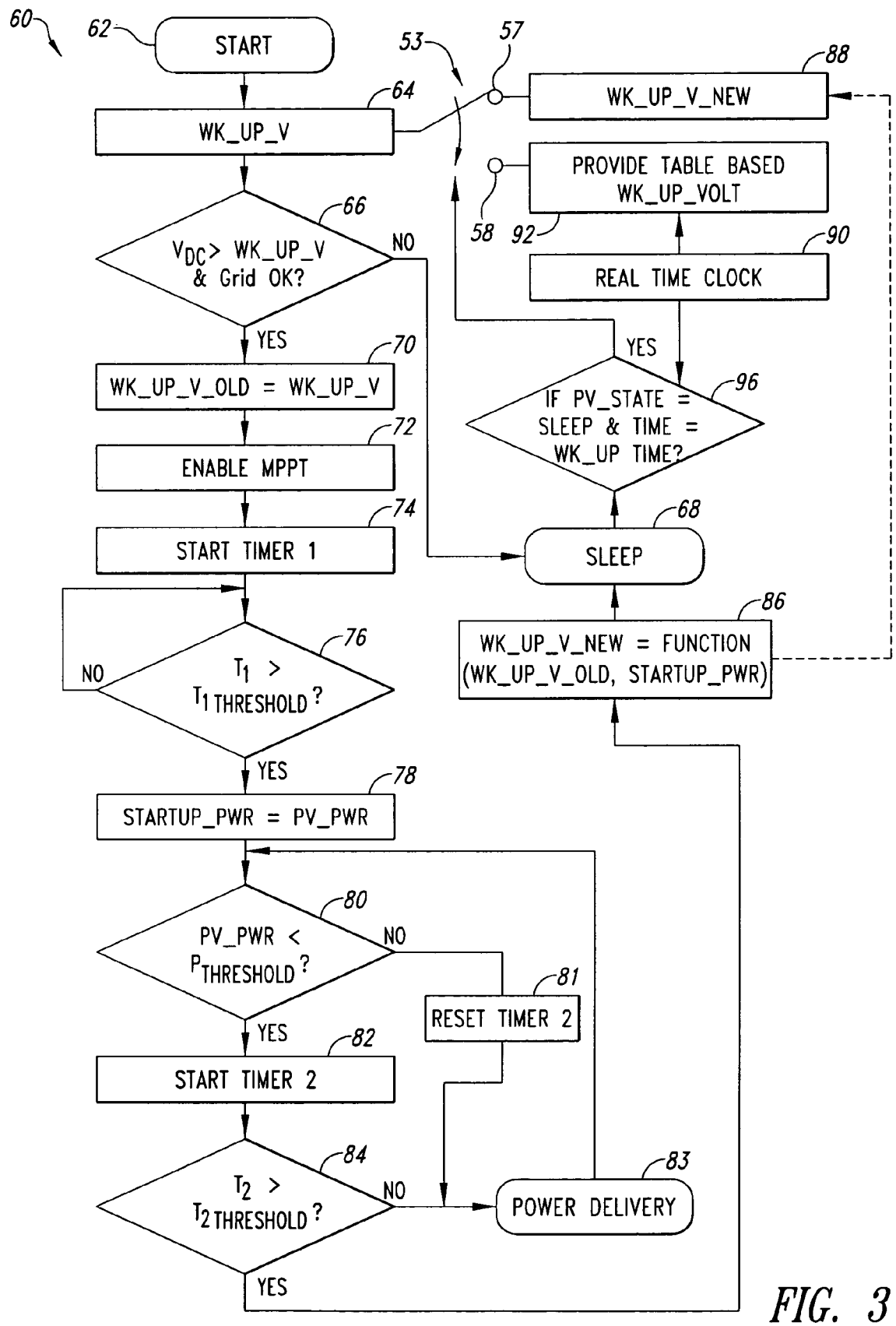
FIG. 3 is a flow diagram of a method of operating the electrical power converter system according to one embodiment of the present systems and methods.

FIG. 3 shows a method 60 of operating the electrical power converter system 10, starting in step 62. In step 64, the controller 24 selects a wakeup voltage WK_UP_V employing the switch 53. In step 66, the controller 24 determines if a voltage $V_{DC}$ across the DC bus 18 is greater than the wakeup voltage WK_UP_V, and determines whether the characteristics of the power grid 14 are suitable for exporting power to the power grid 14. If not, the controller 24 places the main inverter 16 into a sleep mode in step 68. If the voltage $V_{DC}$ across the DC bus 18 is greater than the wakeup voltage WK_UP_V, the controller 24 stores the wakeup voltage WK_UP_V in a register WK_UP_V_OLD in step 70.

In step 72, the controller 24 enables a maximum power point tracking algorithm.

Various alternatives for maximum power point tracking are discussed in detail in commonly assigned U.S. provisional patent application Ser. No. 60/467,332, filed May 2, 2003, entitled "NEW MAXIMUM POWER POINT TRACKING TECHNIQUE FOR A GRID-LINK PHOTOVOLTAIC INVERTER"; U.S. provisional patent application Ser. No. 60/470,321, filed May 12, 2003, entitled "METHOD AND APPARATUS FOR TRACKING MAXIMUM POWER POINT FOR A GRID-LINKED PHOTOVOLTAIC INVERTER" U.S. Provisional Patent Application Ser. No. 60/470,323, filed May 12, 2003, entitled "METHOD AND APPARATUS FOR ADJUSTING WAKEUP TIME IN ELECTRICAL POWER CONVERTER SYSTEMS AND TRANSFORMER ISOLATION,"; and U.S. patent application Ser. No. 10/836,121, entitled "METHOD AND APPARATUS FOR DETERMINING A MAXIMUM POWER POINT OF PHOTOVOLTAIC CELLS," and filed Apr. 30, 2004,.

In step 74, the controller 24 starts a first timer $T_1$. In step 76, the controller determines whether the first timer $T_1$ has exceeded a first timer threshold $T_{1THRESHOLD}$. If the first timer $T_1$ has not exceeded the first timer threshold $T_{1THRESHOLD}$, the controller 24 executes a wait loop, returning to step 76. If the first timer $T_1$ has exceeded the first timer threshold $T_{1THRESHOLD}$, the controller 24 passes control to step 78.

In step 78, the controller 24 sets a variable startup power STARTUP_PWR equal to the power PV_PWR from the photovoltaic array 12. In step 80, the controller 24 determines whether the power PV_PWR from the photovoltaic array 12 is less than a defined power threshold $P_{THRESHOLD}$. If the power PV_PWR from the photovoltaic array 12 is not less than the defined power threshold $P_{THRESHOLD}$, the controller 24 resets a second timer $T_2$ in step 81 and provides signals that causes the inverter to deliver power in step 83.

If the power PV_PWR from the photovoltaic array 14 is less than the defined power threshold $P_{THRESHOLD}$, the controller 24 starts the second timer $T_2$ in step 82. In step 84, the controller 24 determines whether the second timer $T_2$ has exceeded a second timer threshold $T_{2THRESHOLD}$. If the second timer $T_2$ has not exceeded a second timer threshold $T_{2THRESHOLD}$, the controller 24 provides signals that cause the inverter to deliver power in step 83. If the second timer $T_2$ has exceeded a second timer threshold $T_{2THRESHOLD}$, the controller 24 calls or executes a function to produce a new wakeup voltage WK_UP_V_NEW in step 86. In step 88, the new wakeup voltage WK_UP_V_NEW is supplied to the one node 57 of the switch 53, as indicated by the broken line. The controller 24 then causes the main inverter 16 to enter the sleep mode in step 68.

In step 90, a real time clock produces a signal indicative of the real time (i.e., in contrast to a system clock or bus clock). In step 92, the controller 24 employs a lookup table to provide a table based wakeup voltage WK_UP_VOLT based on the real time. The table based wakeup voltage value WK_UP_VOLT is supplied to other node 58 of the switch 53. The step of providing the real time may be provided in parallel with one or more of the other steps.

In step 96, the controller 24 determines 1) whether the main inverter 16 is in a sleep state (i.e., logical EQUAL); and (i.e., logical AND) 2) whether the time is equal to the wakeup time (i.e., logical EQUAL). If the answer to both questions is TRUE, the converter 24 sets the switch 53 to node 58 to select the table derived wakeup voltage WK_UP_VOLT. If the answer to either or both questions is FALSE, the controller 24 sets the switch 53 to node 57, to select the mathematically calculated wakeup voltage WAKE_UP_V_NEW.

Although specific embodiments of, and examples for, the power system and associated methods are described herein for illustrative purposes, various equivalent modifications can be made without departing from the spirit and scope of the invention, as will be recognized by those skilled in the relevant art. The teachings provided herein of the present systems and methods can be applied to other power systems, not necessarily the exemplary power systems and methods generally described above. For example, the present method and apparatus may be employed in electrical power converter systems 10 having power sources other than PV arrays 12. For example, the method and apparatus may be employed in micro-turbine applications where appropriate (e.g., hydro-electrical applications), with or without modifications. For example, in micro-turbine applications, the electrical power converter system 10 may employ a rectifier to transform an AC output from the micro-turbine to DC power, a DC/DC converter to condition and adjust the voltage of the DC power, and an inverter to transform the DC power to AC for export to the power grid 14. The electrical power converter system 10 may include additional elements such as a DC/DC converter. Also for example, the methods discussed herein can include additional steps, eliminate some steps, and/or perform steps in a different order.

The various embodiments described above can be combined to provide further embodiments. All of the above U.S. patents, U.S. patent application publications, U.S. patent applications, foreign patents, foreign patent applications and non-patent publications referred to in the this specification and/or listed in the Application Data Sheet, including but not limited to U.S. provisional patent application Ser. No. 60/467,332,. filed May 2, 2003, entitled "NEW MAXIMUM POWER POINT TRACKING TECHNIQUE FOR A GRID-LINK PHOTOVOLTAIC INVERTER"; U.S. provisional patent application Ser. No. 60/470,321, filed May 12, 2003, entitled "METHOD AND APPARATUS FOR TRACKING MAXIMUM POWER POINT FOR A GRID-LINKED PHOTOVOLTAIC INVERTER"; U.S. Provisional Patent Application Ser. No. 60/470,323, filed May 12, 2003, entitled "METHOD AND APPARATUS FOR ADJUSTING WAKEUP TIME IN ELECTRICAL POWER CONVERTER SYSTEMS AND TRANSFORMER ISOLATION"; and U.S. patent application Ser. No. 10/836,121, entitled "METHOD AND APPARATUS FOR DETERMINING A MAXIMUM POWER POINT OF PHOTOVOLTAIC CELLS," and filed Apr. 30, 2004, are incorporated herein by reference in their entirety. Aspects of the present systems and methods can be modified, if necessary, to employ systems, circuits and concepts of the various patents, applications and publications to provide yet further embodiments of the present systems and methods.

These and other changes can be made to the present systems and methods in light of the above-detailed description. In general, in the following claims, the terms used should not be construed to limit the invention to the specific embodiments disclosed in the specification and the claims, but should be construed to include all power systems and methods that operate in accordance with the claims. Accordingly, the invention is not limited by the disclosure, but instead its scope is to be determined entirely by the following claims.

The invention claimed is:

1. A method of operating an electrical power converter system to transform power from a power source, the method comprising:
   selecting between a value of a wakeup voltage parameter calculated in real time and a value of the wakeup voltage parameter stored in a historically based lookup table, wherein the value of the wakeup voltage parameter from the historically based lookup table is based at least in part on a real world time;
   determining a voltage available from the power source;
   determining if the determined voltage available from the power source exceeds the selected value of the wakeup voltage parameter;
   if the determined voltage available from the power source exceeds a threshold corresponding to the selected value of the wakeup voltage parameter,
      determining a power available from the power source;
      determining if the power available from the power source is less than a startup power threshold;
      providing power to a load if the power available from the power source is not less than the startup power threshold;
      calculating a value of the wakeup voltage parameter based on the power available from the power source with respect to the startup power threshold; and
      activating power electronics that are brought out of a sleep state.

2. The method of claim 1, further comprising:
   enabling a maximum power point tracking algorithm in response to determining that the determined voltage available from the power source exceeds the selected value of the wakeup voltage parameter.

3. The method of claim 1, further comprising:
   waiting a first defined period of time after enabling the maximum power point tracking algorithm to allow some transients, if any, to settle before determining the power available from the power source.

4. The method of claim 1, further comprising:
   determining that the determined power available from the power source remains below the startup power threshold for a defined period of time before calculating the value of the wakeup voltage parameter.

5. The method of claim 1, further comprising:
   entering a sleep operating state without providing power to a load if the determined voltage available from the power source does not exceed the selected value of the wakeup voltage parameter.

6. The method of claim 5, further comprising:
   decoupling a transformer of the electrical power converter system from a grid when entering the sleep operating state of the electrical power converter system.

7. The method of claim 1 wherein selecting between a value of a wakeup voltage parameter calculated in real time and a value of the wakeup voltage parameter stored in a historically based lookup table, wherein the value of the wakeup voltage parameter from the historically based lookup table is based at least in part on a real world time, comprises:
   determining a real time;
   determining an operating state of the electrical power converter system;

selecting the wakeup voltage parameter stored in the historically based lookup table if both the operating state is a sleep state and the real time is at least equal to a wakeup time.

8. An electrical power converter system, comprising:
an input bus;
an output bus;
at least one switch electrically coupled between the input and the output buses; and
a controller coupled to control the at least one switch, the controller configured to select between a value of a wakeup voltage parameter calculated in real time and a value of the wakeup voltage parameter stored in a historically based lookup table, wherein the value of the wakeup voltage parameter from the historically based lookup table is based at least in part on a real world time, and configured to determine an amount of power available from a power source at approximately a startup time, such that in response to the determined amount of power from the power source surpassing a threshold corresponding to the wakeup voltage parameter, power electronics are brought out of a sleep state and activated.

9. The electrical power converter system of claim 8 wherein the controller is configured to select the value of the wakeup voltage parameter stored in the historically based lookup table if both an operating state of the electrical power converter system is a sleep state and a real time is at least equal to a wakeup time.

10. The electrical power converter system of claim 9 wherein the controller is configured to determine if a voltage available from the power source exceeds the selected value of the wakeup voltage parameter; if the determined voltage available from the power source exceeds the selected value of the wakeup voltage parameter, provide power to a load if a power available from the power source is not less than a startup power threshold; and calculate a value of the wakeup voltage parameter based on the power available from the power source relative to the startup power threshold.

11. The electrical power converter system of claim 9 wherein the controller is configured to execute a maximum power point tracking algorithm in response to determining that a voltage available from the power source exceeds the selected value of the wakeup voltage parameter.

12. The electrical power converter system of claim 11 wherein the controller is configured to place the electrical power converter system into a sleep operating state without providing power to a load if the voltage available from the power source does not exceed the selected value of the wakeup voltage parameter.

* * * * *